UNITED STATES PATENT OFFICE.

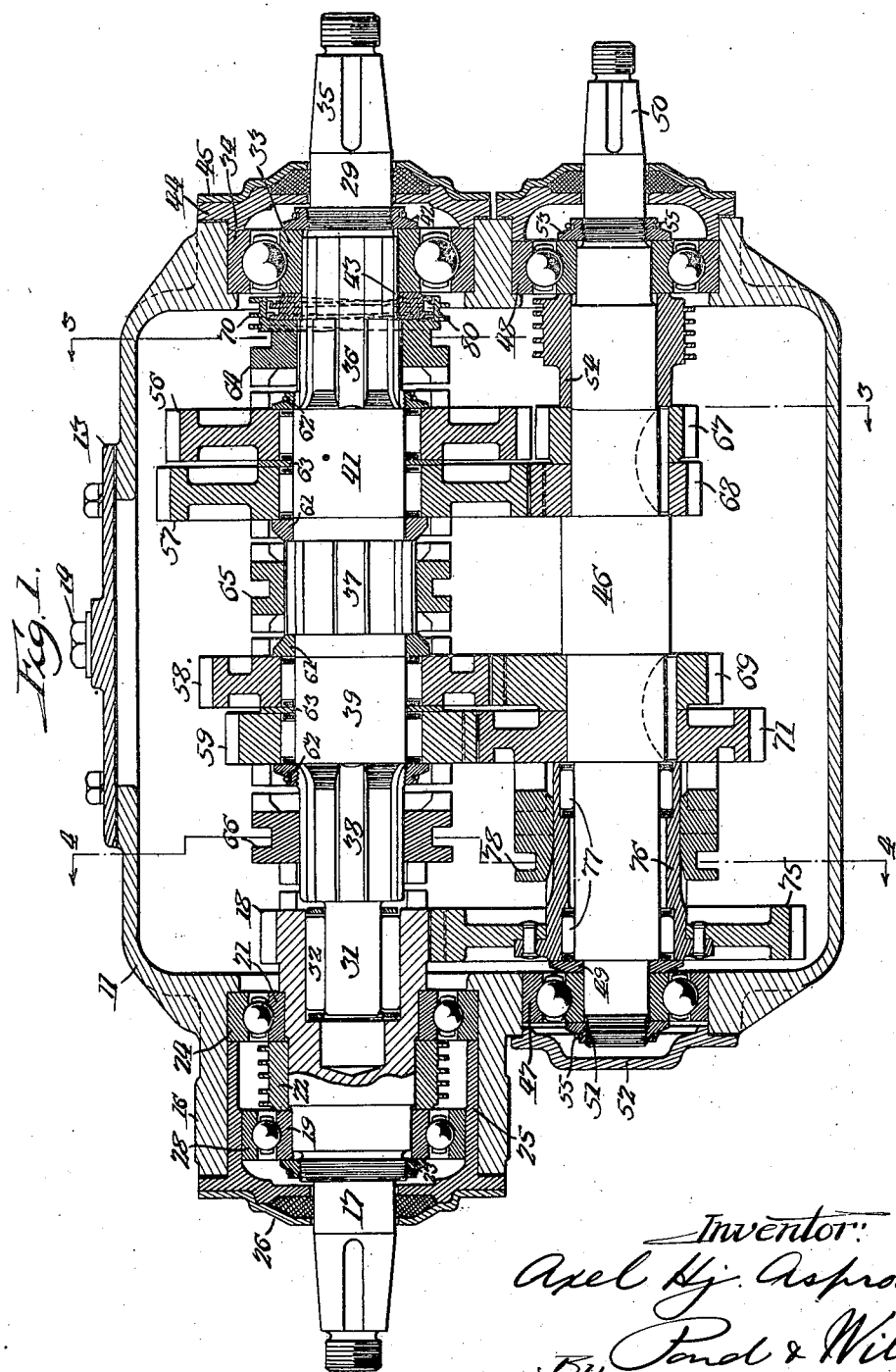

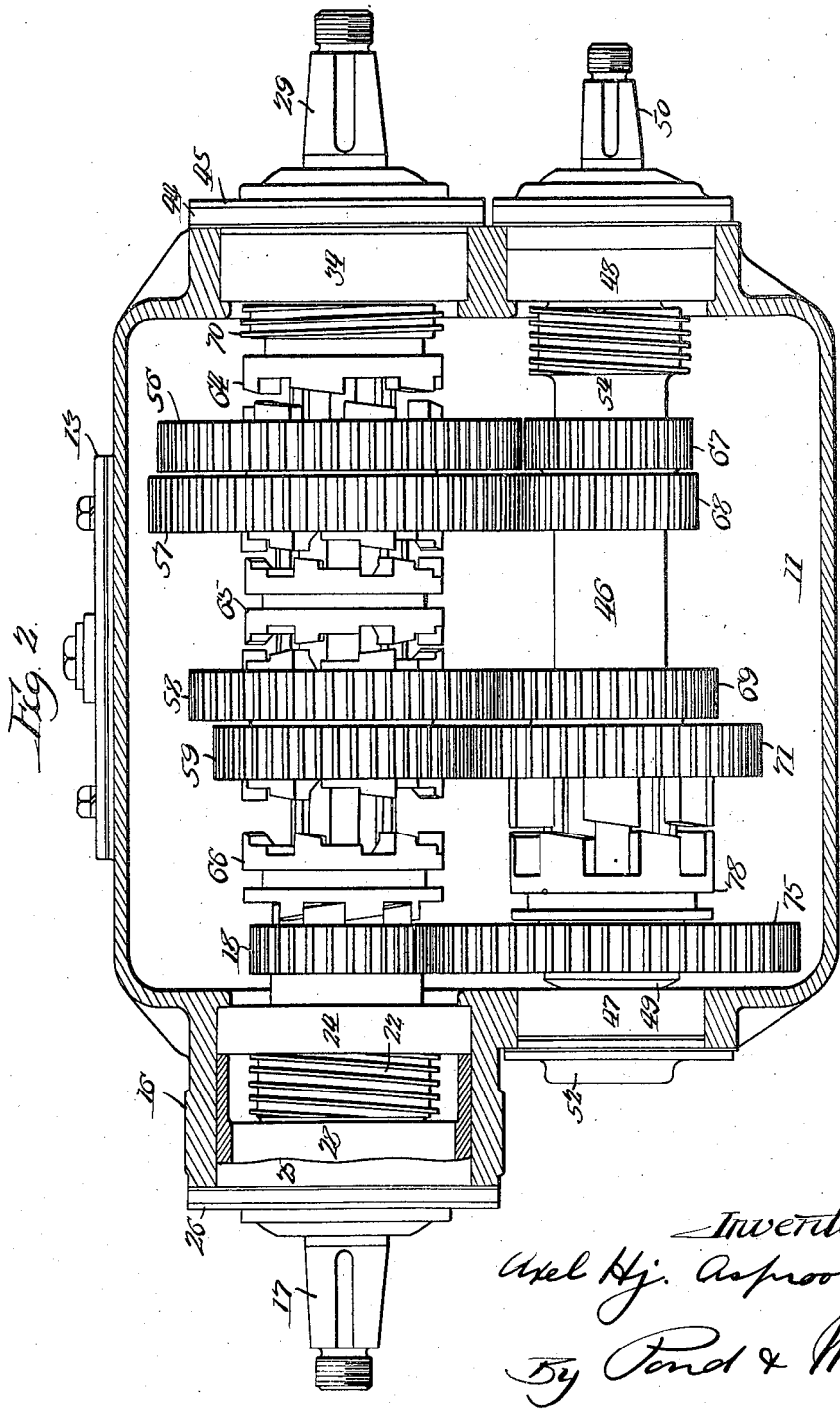

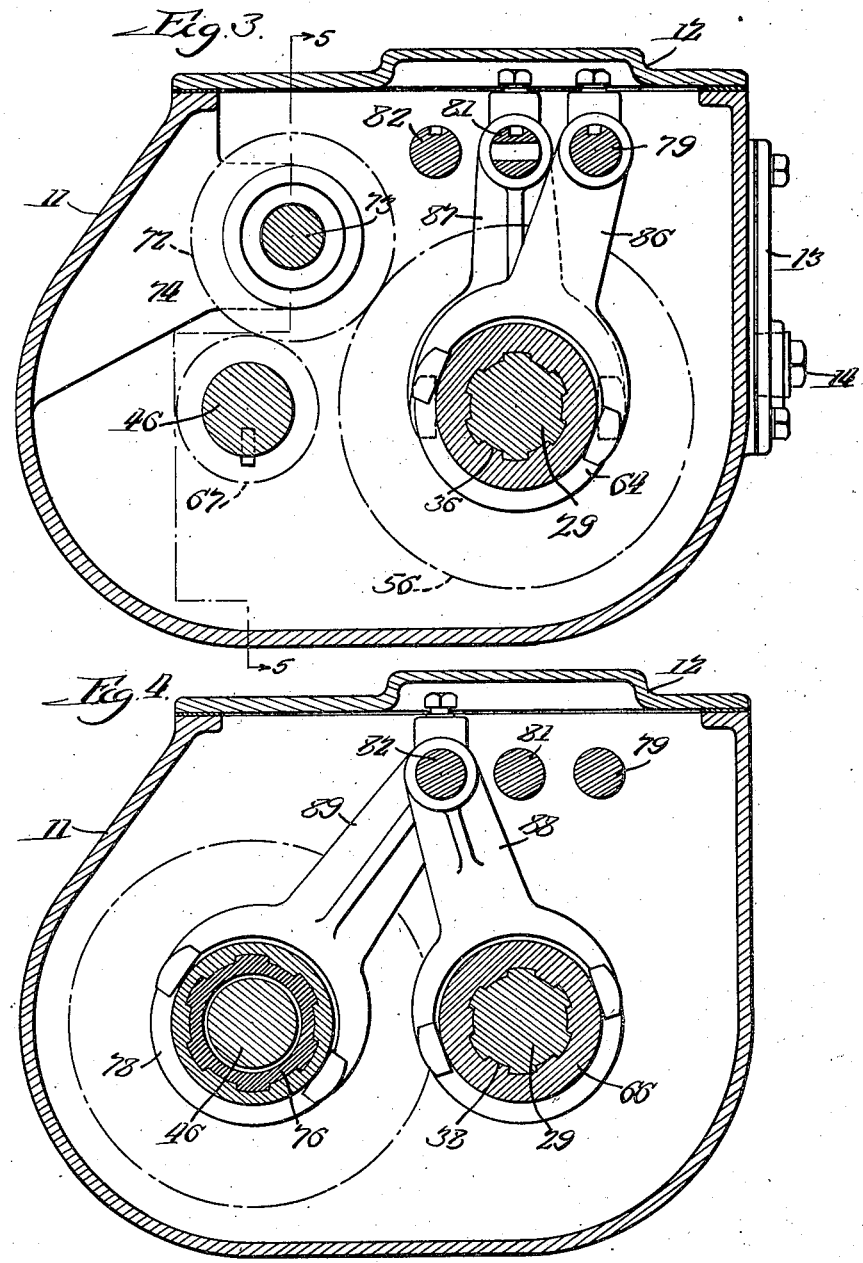

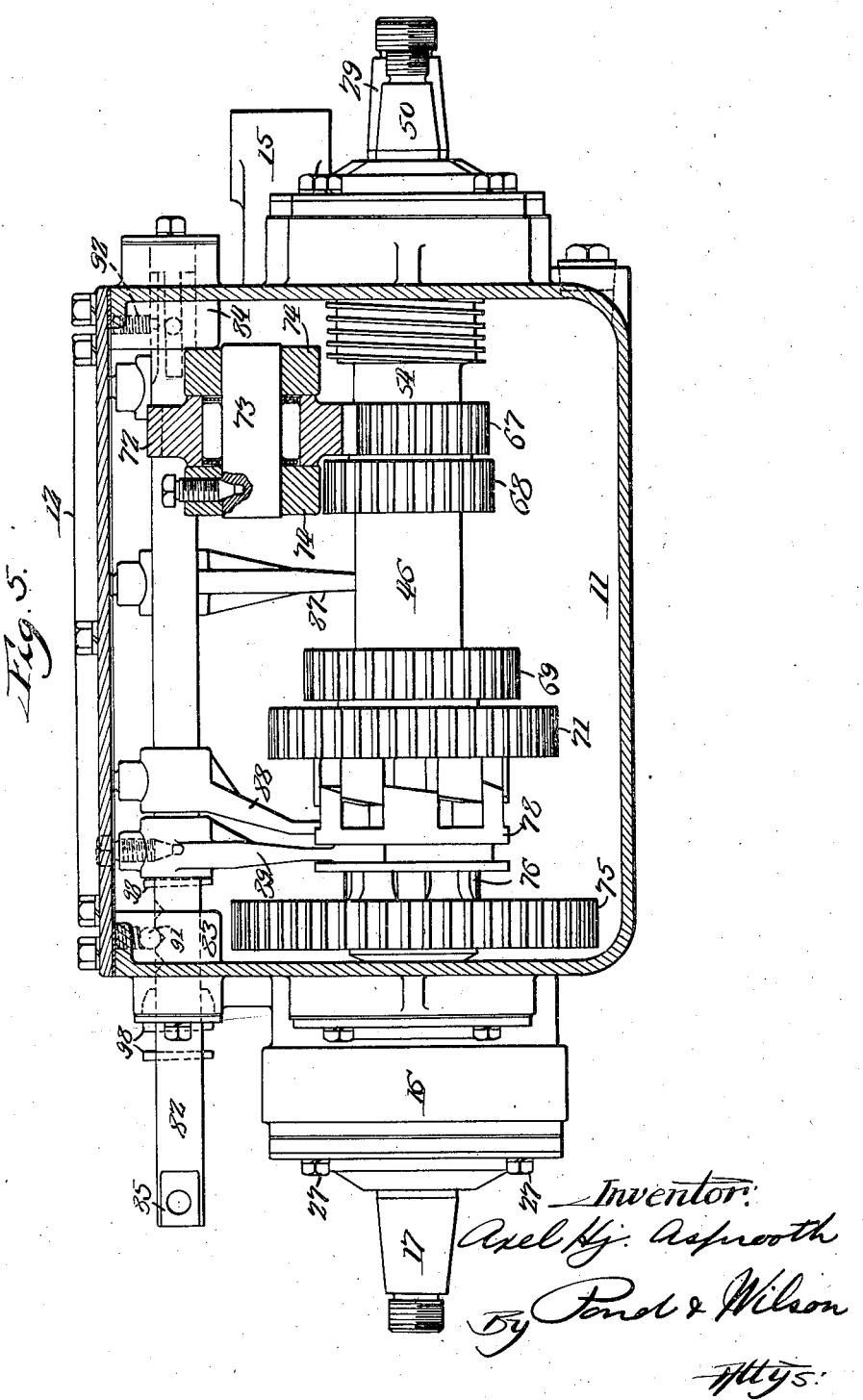

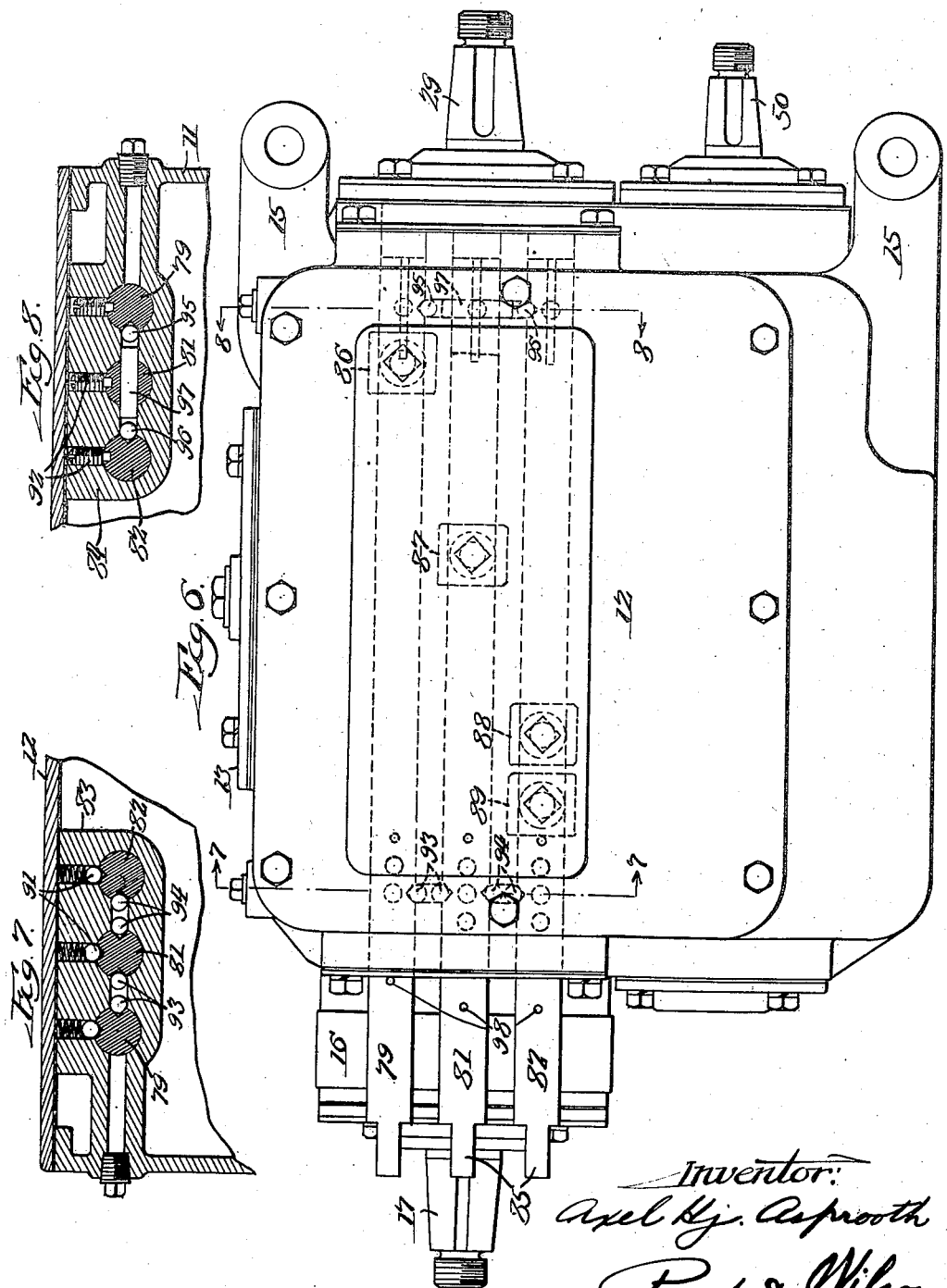

AXEL HJ. ASPROOTH, OF ROCKFORD, ILLINOIS, ASSIGNOR TO COTTA TRANSMISSION COMPANY, OF ROCKFORD, ILLINOIS, A CORPORATION OF ILLINOIS.

CHANGE-SPEED GEARING.

1,262,618.     Specification of Letters Patent.     Patented Apr. 16, 1918.

Application filed September 27, 1917. Serial No. 193,413.

*To all whom it may concern:*

Be it known that I, AXEL HJ. ASPROOTH, a citizen of the United States, residing at Rockford, in the county of Winnebago and State of Illinois, have invented certain new and useful Improvements in Change-Speed Gearing, of which the following is a specification.

This invention relates in general to change speed gearing, and has more particular reference to that type of gearing or gear transmission in which all of the gears are constantly in mesh and the change in speed is effected by means of clutches, such a transmission unit being especially adapted for motor vehicles of various classes and being generally known as of a selective type individual clutch system.

The primary object of my invention is to provide a change speed transmission of generally improved construction, by which greater durability and efficiency are obtained under the severest and heaviest kind of usage and by which the changes in speed may be made instantly with perfect ease and without danger of the engagement of two speeds at the same time.

In furtherance of these general objects, I have incorporated into my improved transmission various novel features, which mentioned now but briefly, will be more fully described hereinafter. One feature resides in an improved means for establishing the driving connection between the driving shaft and countershaft, in which no gears are shifted but a clutch arranged and mounted in a novel manner is shifted simultaneously with the direct or high speed clutch to render the countershaft and its gear either idle or driving, as the case may be. Another feature is found in the means employed for controlling and shifting the several clutches. In this, a number of shiftable rods carrying the clutch shifting forks are arranged in an advantageous manner, and any two are positively locked against operation by a novel means when any one rod is operated. Still another feature of the invention lies in the provision of means operating to work oil or lubricant in the casing inwardly away from the stuffing box of the driven shaft, or rather, from the casing wall through which the shaft extends, so as to preclude the tendency of the lubricant leaking or working through the stuffing box when the driven shaft is revolved in either the reverse or any forward speed.

These and other objects and attendant advantages will be more readily appreciated as the invention becomes better understood by reference to the following description when considered in connection with the accompanying drawings, in which—

Figure 1 is a longitudinal horizontal sectional view through a change speed transmission embodying my improvements, showing the parts in neutral position;

Fig. 2 is a somewhat similar sectional view, but showing the gears, clutches, shafts and bearings in elevation and the fourth or direct speed clutch engaged;

Figs. 3 and 4 are cross-sectional views taken substantially on the lines 3—3 and 4—4, respectively, of Fig. 1;

Fig. 5 is a vertical sectional view taken longitudinally of the transmission substantially on the line 5—5 of Fig. 3;

Fig. 6 is a plan view of the transmission; and

Figs. 7 and 8 are detail sectional views taken on the lines 7—7 and 8—8, respectively, of Fig. 6.

The change speed transmission in which I have shown my improvements in the drawings for purpose of illustration has been designed as the transmission unit for motor trucks, especially for large heavy duty trucks for both commercial and military purposes. It should be understood, however, that my improvements are not limited to a transmission adapted for this particular purpose, since they might be equally well embodied in transmissions designed for other types of motor vehicles or for analogous purposes. In the present instance, therefore, special attention has been directed to the obtaining of a construction which will be most practical and durable under the severest conditions of usage and in which at the same time the changes in speed may be made very quickly and easily. Consequently, the operating parts must be well mounted on substantially large bearings properly arranged; the parts must be well lubricated and special provision must be made for housing the mechanism and for confining the lubricant thereto under all conditions of operation; and a most efficient, direct, and positive means must be provided for changing the speeds, that is, for selecting any speed desired, without the possibility of engaging two speeds at once and consequently injuring the mechanism.

In the drawings, I have illustrated only the transmission unit, as it is well understood that the driving and driven elements thereof shall be properly connected to the driving and driven members of a truck. The casing or housing which supports the transmission mechanism may be of any suitable design, and as shown, is constructed so as to form one main casing designated generally by reference character 11, provided with a removable top cover 12 and a side cover 13, which allow proper access to the mechanism within the casing, the side casing being provided with an oil plug 14. In mounting the casing, a three-point suspension is employed, the casing being secured in place at its rear end by means of the two arms 15 (Figs. 5 and 6), and at its forward end through the agency of the bearing housing 16 which is adapted to be embraced by a suitable fastening means (not shown) secured to the frame of the vehicle.

The driving element, designated generally by reference character 17, is journaled in the casing extension 16 and is properly shaped at its forward end for connection with the engine, a universal joint to the clutch shaft, or otherwise, as the case may be. The driving member or shaft, being relatively short and formed with a driving spur gear or pinion 18 just within the front end of the casing proper, is mounted on a pair of longitudinally spaced ball bearings, the inner raceways or rings 19 and 21 of which are held in spaced relation by a spacing collar 22 and are pressed onto the shaft and locked thereto by a lock-nut 23 in the manner shown. The outer raceway 24 of the innermost bearing is held in position by a housing 25, in which the cover 26 forms a stuffing box for the driving member and is secured with said cover to the housing 16 by means of suitable machine screws 27. The outer race-way 28 of the outermost ball bearing is snugly but loosely held in position by the housing 25. While the inner race-ways of these bearings are rigidly secured to the driving member, the outer race-ways are not absolutely tight, because an allowance must be made for creepage so that the load will not be always carried or brought to bear on the race-ways at one point. This is also true with regard to the other main ball bearings mentioned hereinafter. The spacing collar 22 is equipped on its periphery with a left hand spiral thread which serves to work the oil and lubricant away from the stuffing box, and thus prevent the oil from crowding and leaking through the same when the driving shaft is in operation.

The driven element or shaft, designated in general by reference character 29, stepped at its forward end 31 in a roller bearing 32 in the driving shaft and mounted at its rear end on a ball bearing consisting of the inner and outer race-ways 33 and 34, respectively, is suitably shaped at its rear end 35 for attachment to a universal joint or any other means connected to the rear wheels, and is further shaped intermediate its ends to provide spline-ways 36, 37 and 38, for the reception of the sliding elements of clutches and intermediate surfaces 39 and 41 for the reception of roller bearings upon which are mounted gears described hereinafter. The inner race-way 33 of the ball bearing at the rear end of the driven shaft is held in position by a clamp nut 42 which urges said race-way against a spacing collar 43, in turn held against a shoulder on the shaft and equipped with a peripheral oil groove or thread which will be described more particularly hereinafter. The outer race-way 34 of this bearing is suitably held in position by a housing 44, which with the cap 45 provides a stuffing box at the rear end of the driven shaft, these parts being secured to the main casing by suitable machine screws.

A countershaft designated in general by character 46, is mounted at its ends in spaced parallel relation to the alined driving and driven shafts on ball bearings 47 and 48, the construction and function of which are substantially the same as the ball bearings for the driving and driven shafts just described. The inner race-way of the front ball bearing 47 is held in position against a spacing ring 49 and shoulder by means of a clamping nut 51, a suitable cap 52 covering this end of the casing, and the inner race-way of the rear ball bearing is similarly held in position by a clamp nut 53 which urges the race-way against a spacing collar 54, which in turn urges a pair of gears, mentioned hereinafter, against a shoulder on the shaft. A stuffing box similar to those previously described houses the rear end of the countershaft. The clamp nuts employed may be of any suitable construction, and in this instance, are provided with locking springs 55 which preclude displacement of the clamp or lock nuts. The rear end of the countershaft may be extended to provide a power attachment 50 from which power may be taken for general purposes.

In this type of transmission, the gears between the driving and driven shafts and the transmission shaft are always in mesh and clutches are provided for locking selected gears to the shafts to effect the selected change in speed. Also, the drive is transmitted through the countershaft to the driven shaft on all speeds except the high speed, in which the driving and driven shafts are connected directly and the countershaft and all gears connected thereto remain idle. In the present instance, a four-speed and reverse selective type transmission is provided, in which any speed may be obtained by engaging a separate clutch therefor. There is loosely mounted on roller bearings 60 on the portions 39 and 41 of the driven shaft differently sized gears 56, 57, 58 and 59, which are confined against lengthwise movement by the fixed collars 61 and the clamp nuts 62, a spacing and bearing washer 63 being interposed between each pair of gears, as shown. Each of these gears together with the gear 18 on the driving shaft, is equipped on one side with a toothed clutch face adapted to be engaged by a sliding clutch element on the shaft. The clutches 64, 65 and 66 splined respectively on the portions 36, 37 and 38 of the driven shaft are adapted to engage respectively with the opposed clutch faces on the gears, as is obvious, certain of the clutches having double-step faces, as clearly shown in Fig. 2, to insure quick and easy engagement without too severe a strain on the teeth. The clutches are adapted to be shifted, one at a time, at the will of an operator, by shifting mechanism described later. The gears on the driven shaft just referred to are constantly in mesh with gears 67, 68, 69 and 71 respectively, fixed to the countershaft 46, the driving connection between the gear 56 and the gear 67 being through the intermediary of an idler gear 72 loosely mounted on the shaft 73 held in bearings 74 formed integral with the main casing, thus establishing a reverse drive connection.

A novel means is provided for establishing connection between the driving shaft 17 and countershaft 46 in the form of a gear 75 in mesh with the driving pinion or gear 18 and provided with a relatively long sleeve or hub 76 mounted at each end on roller bearings 77 on the countershaft and having splined on its periphery a clutch 78 formed with relatively long teeth adapted to engage with similar teeth fixed to the countershaft, in this instance, through the agency of the gear 71. It will be obvious that by means of this clutch 78 the driving connection between the driving shaft and countershaft may be established or disconnected. It might be here mentioned, however, that the clutch 66 and the clutch 78 are connected together by means described later, so that these clutches will always move in unison for the reason that when the clutch 66 is moved to the left, viewing Fig. 1, thereby connecting the driven shaft 29 directly to the driving shaft 17 and establishing the direct or high speed, it is essential that the driving connection between the drive shaft and the countershaft shall be discontinued. Consequently, when the clutch 66 is moved to the left, the clutch 78 will be correspondingly moved and disengaged, thereby allowing the gear 75 to revolve freely about the countershaft, rendering the latter idle. It will also be noted by reason of this construction, that the clutches 66 and 78 move in the same direction, allowing a common operating means, mentioned hereinafter, to be employed, and that the countershaft driving gear 75 has a bearing of substantial length and at the same time it itself serves to carry the countershaft clutch. It will be further noted that the driving connection between the driving shaft and the countershaft is established through the agency of the clutch 78 at all times when the clutch 66 is disengaged from the driving shaft, since the teeth of the clutch 78 are of sufficient length and are so arranged that while engaged the clutch 66 may be moved into and out of engagement with the teeth on the gear 59. By reason of the foregoing, the clutch 64 when engaged with the gear 56 establishes the reverse speed drive, the clutch 65 when moved to the right and engaged with the gear 57 establishes the first or slowest speed, and when moved to the left into engagement with the gear 58 establishes the second speed, and that the clutch 66 establishes the third and fourth speeds by connection with the gears 59 and 18, respectively. Thus, the clutches commencing from the rearmost one forwardly establish in order the reverse, first, second, third and fourth speeds respectively.

It is desirable to provide means for working oil or lubricant in the casing inwardly from the stuffing boxes when the transmission is in operation so as to avoid the tendency of the lubricant working through and leaking from the stuffing boxes. I have, therefore, equipped the driving shaft, driven shaft and countershaft with peripheral spiral oil grooves or threads adapted when the shafts are revolved to work the oil inwardly from the stuffing boxes. Since the driving shaft 17 and the countershaft 46 are driven in one direction only, I have equipped the spacing collars 22 and 54 mounted respectively on said shafts, with peripheral left hand spiral threads, as shown, which are adapted to work the oil inwardly away from the stuffing boxes adjacent thereto. In the case of the driven shaft, however, special provision must be made because this shaft is revolved in both directions. I have, therefore, provided a novel means for working the oil inwardly when the shaft is revolved in either one or the other direction. This consists of a peripheral right hand oil groove or thread 70 formed integral with the clutch element 64 so that when the driven shaft is revolved in any forward speed, this right hand thread will work the oil inwardly. When, however, the direction of drive is reversed, this right hand thread would have a tendency to work the oil outwardly, and to obviate this I have equipped the spacing collar 43 with a peripheral spiral thread 80 of a lead in a different direction from that on the clutch element, adapted to work the oil inwardly when the reverse speed is engaged. I have combined the right hand thread 70 with the clutch element 64 and constructed the latter so that it covers or embraces the thread 80 in the manner shown in Fig. 1, when the clutch is in neutral position. In this position, the inner left hand thread 80 has no effect on the oil, and when the reverse clutch is engaged its thread portion 70 would be removed from about the said left hand thread, allowing the latter to function in working the oil inwardly.

Coming now to the means for shifting and controlling the several clutches, it might be mentioned that I have aimed to provide a simple and positive means for engaging any one clutch at a time and for locking the other clutches against being operated, and to accomplish this result by mechanism which is simple and thoroughly practical, both from a manufacturing and an operating standpoint. For this purpose, referring especially to Figs. 3 to 8 inclusive, it will be seen that I have slidably mounted three shifting rods 79, 81 and 82 in spaced parallel relation in a common plane above the gear equipped shafts, in bearings 83 and 84 at the front and rear end respectively, of the main casing. The shifting rods pass through suitable packing or felt washers at the forward end of the bearing 83, and extending forwardly beyond this bearing, are adapted to be operated at their front ends 85 (that is, shifted lengthwise individually at the will of an operator) by suitable mechanism not shown herein. These shifting rods are each equipped with depending shifting forks engaged at their forked ends in the annular grooves in the clutches so that upon shifting any rod lengthwise its respective clutch will be engaged or disengaged, as the case may be. As shown in Figs. 3 and 6, a shifting fork 86 fixedly secured to the shifting rod 79 by means of a suitable set screw is engaged at its forked end in the groove of the reverse speed clutch 64, and the shifting fork 87 secured to the intermediate shifting rod 81 engages the first and second speed clutch 65. And by reference to Figs. 4 and 6, it will be seen that the shifting forks 88 and 89 both secured to the shifting rod 82, connect respectively with the third and fourth speed clutch 66 and the countershaft clutch 78.

In all views except Fig. 2, the parts are shown in neutral position, that is, all speed clutches are disengaged, and assuming that the driving shaft is being revolved the countershaft and all the gears will be likewise revolved. The shifting rods are yieldingly held against displacement from this position and from any shifted position by spring-pressed balls or detents 91 (Figs. 5 and 7) urged into notches in the top of the rods and the rods are held against rotative movement by means of key-way screws 92 (Fig. 8) located in key-ways in the rods, so that the shifting forks will not bear against the clutch grooves in a manner to cause undue wear and frictional contact thereon. Upon shifting any rod lengthwise, the other two rods will be automatically positively locked against shifting movement until the shifted rod has been returned to its original position. This means, best shown in Figs. 7 and 8, consists in the present instance of a pair of steel balls 93 and 94 disposed in the openings between the central shifting rod and the two outer rods and adapted to seat in cone notches in the respective rods. These locking balls or members are of such size and so arranged that upon shifting a rod lengthwise, for example, as by shifting the rod 79 lengthwise for the purpose of engaging the reverse speed clutch 64, the ball 93 will be forced out of its notch into engagement with its complemental locking ball and confined against movement in the opening between the periphery of the rod 81 and said complemental ball, so that this rod 81 will be positively locked against lengthwise shifting movement by its locking ball 93. Upon returning the shifting rod 79 to its original or neutral position, it will be obvious that the moved locking ball 93 may again enter its notch in the bar, thereby allowing the rod 81 to be shifted if desired. In the same manner if the rod 82 is shifted to engage either the third or fourth speed clutch the central rod 81 will be locked against shifting movement, and after the shifting rod 82 has been returned to a neutral position the rod 81 may be shifted to engage either the first or second speed clutch and will thereupon positively lock both adjoining shifting rods 79 and 82 against movement. Under this arrangement, however, either of the outer shifting rods 79 or 82 will not lock the other when shifted, hence I have devised an additional locking means illustrated in Fig. 8 which completes the locking device, so that when any one shifting rod has been operated, the other two rods will be positively locked against movement. This locking means, which operates between the shifting rods 79 and 82, consists, in the present instance, of locking balls 95 and 96 adapted to seat in cone notches in the rods 79 and 82, respectively, and a locking rod or spacing element 97 interposed between the balls 95 and 96. When either rod 79 or 82 is moved lengthwise, the locking elements will be moved into abutting relation in the same manner as the locking balls previously described were moved so as to hold the opposite locking ball seated in its notch and thus prevent lengthwise movement of its rod. The holes for the locking balls are drilled from one side of the main casing and are plugged at the ends as shown. The central shifting rod 81 is slotted longitudinally as indicated in Figs. 3 and 8, to provide clearance for the locking element 97. In order to limit movement of the shifting rods in both directions and to prevent undue wear on the shifting forks and clutches, the rods are equipped with projecting stop pins 98 adapted to abut against the ends of the bearing 83.

As already mentioned, either the reverse or any one of the four speeds, may be established by operation of the shifting rods, and for purpose of clarity, the operation of these rods in connection with the shifting of the clutches will be again referred to. Assuming that the driving shaft is being revolved in a clockwise or right hand direction, viewing the front of the transmission, and that the parts are in neutral position, the countershaft and likewise all of the gears on the driven shaft will be revolved through the agency of the clutch 78, and the driven shaft will be idle. To engage the reverse speed, the operator will shift the rod 79 forwardly, thereby engaging the reverse speed clutch 64 and connecting the countershaft to the driven shaft through the agency of the gears 56, 67 and 72. While the drive is being transmitted in the reverse speed, the shifting rods 81 and 82 will be positively locked against shifting movement by the locking means above described, hence it will be absolutely impossible to engage more than one speed at the same time. After the shifting rod 79 has been moved back to neutral position either the rod 81 or 82 may be shifted, and in case the rod 81 is moved rearwardly the clutch 65 will be connected to the first speed gear 57, thereby connecting the driven shaft to the countershaft, and upon movement of the shifting lever 81 to its forward limit the second speed gear 58 will be engaged by the clutch 65 and the second speed established. Upon returning the shifting rod 81 to neutral position the rod 82 may be moved rearwardly to connect its clutch 66 with the third speed gear 59, and upon moving the rod 82 to its forward limit the clutch 66 will connect the driving shaft directly to the driven shaft and will simultaneously disengage the countershaft clutch 78 so that the drive gear 75 will revolve freely about the countershaft and the latter and all of the gears connected therewith will remain idle. Attention is directed to the simple construction and arrangement of the shifting means for establishing the various speeds, to the manner in which the direct speed clutch and the countershaft clutch operate, and to the long bearing of the countershaft drive gear which is revolved during all speeds and serves to carry the countershaft clutch.

It is believed that the foregoing conveys a clear understanding of the construction and operation of my improvements and of the objects prefaced above, and its should be understood that while I have illustrated one practical working embodiment of my improvements, various changes might be made in details of construction without departing from the spirit and scope of the invention as expressed in the appended claims.

I claim:

1. A speed change or shifting device for change speed gearing, including three shifting rods mounted in a common plane to shift lengthwise and each adapted by such movement to effect a change in speed or direction of drive, and locking elements operable between the respective rods and directly actuated by and upon shifting of any rod lengthwise to positively lock the other two rods against lengthwise shifting movement.

2. A speed change or shifting device for change speed gearing including three shifting rods mounted in a common plane to shift lengthwise and each adapted by such movement to effect a change in speed or direction of drive, means operable between the central shifting rod and both outer rods for positively preventing lengthwise movement of any one rod when the next adjoining rod has been shifted, and other means operable between only the two outer rods for preventing lengthwise movement of one when the other is shifted, whereby when any rod is shifted lengthwise, the other two will be positively locked against lengthwise movement.

3. An operating device comprising three members slidable lengthwise in a common plane, means for positively locking any two members against lengthwise movement when the other member has been so moved, comprising means directly operable between the central member and each outer member for locking any one member against lengthwise movement when the next adjoining member has been moved lengthwise, and other means operable between only the two outer members for locking one when the other has been moved lengthwise.

4. An operating device comprising three members slidable lengthwise in a common plane, means for positively locking any two members against lengthwise movement when the other member has been so moved, comprising one or more movable elements operable between the central member and each outer member for locking the latter against lengthwise movement when the central member is so moved and for locking the central member when either outer member is so moved, and one or more elements operable between the two outer members for locking either against lengthwise movement when the other is so moved.

5. In a change speed gearing, the combination of clutches individually engageable for effecting reverse, first, second, third and fourth speeds, three shifting rods, one for operating the reverse speed clutch, another for operating the first and second speed clutches and the remaining one for operating the third and fourth speed clutches, said shifting rods being arranged in a substantially common plane and adapted to be shifted lengthwise for establishing their respective speeds, and means for positively locking any two shifting rods against lengthwise movement when the remaining rod has been moved lengthwise to an operating position.

6. In a change speed gearing, the combination of a pair of spaced parallel shafts equipped with intermeshing gears and clutches adapted to establish driving connection between certain gears and the shafts to effect different driving speeds, three shifting rods arranged in spaced parallel relation in a common plane parallel with said shafts and equipped with shifting forks adapted to operate the clutches by movement of the rods lengthwise, and means for automatically locking any two shifting rods against lengthwise movement when the remaining shifting rod has been moved lengthwise to engage one of the clutches.

7. In a change speed gearing, the combination of a pair of shafts arranged in spaced parallel relation and equipped with intermeshing gears, clutches on each shaft for connecting certain gears fixed to the respective shafts whereby to establish the different driving speeds, three shifting rods arranged in spaced parallel relation in a substantially common plane parallel with said shafts and equipped with shifting forks adapted to operate said clutches when the rods are individually shifted lengthwise, and means actuated by any shifted rod to positively lock the other two rods against lengthwise movement.

8. In a change speed gearing of the character described, the combination of a driving and a driven member, a countershaft, gearing between the driving and driven members and the counter-shaft always in mesh, a clutch for connecting the driving member directly to the driven member, a clutch for connecting the driving member to the counter-shaft, and a common operating member connected with both clutches for positively moving both in unison to fully engage the one and disengage the other when moved in one direction, and to fully disengage and engage, respectively, said clutches when moved in the opposite direction.

9. In a change speed gearing of the character described, the combination of a driving and a driven member, a countershaft, gearing between the driving and driven members and the countershaft always in mesh, a clutch for connecting the driving member directly to the driven member, a clutch for connecting the driving member to the countershaft, the latter clutch having a splined connection with a countershaft gear in mesh with a gear fixed to the driving shaft and adapted to engage a clutch element on the countershaft, and means for moving the two clutches simultaneously to engage the direct speed clutch and disengage the countershaft clutch, and vice versa.

10. In a change speed gearing of the character described, the combination of a driving and a driven member, a countershaft, gearing between the driving and driven members and the countershaft always in mesh, a clutch for connecting the driving member directly to the driven member, a clutch for connecting the driving member to the countershaft, the latter clutch being splined on a hub or sleeve of a gear loose on the countershaft and in mesh with a gear fixed to the driving shaft, said clutch being adapted to engage with a clutch element fixed to the countershaft, and means for moving both clutches in unison to simultaneously engage the direct speed clutch and disengage the countershaft clutch, and vice versa.

11. In a change speed gearing of the selective individual clutch type, the combination of a driving and a driven member, a countershaft, gearing between the countershaft and the driving and driven members always in mesh, including a gear fixed to the driving member and in mesh with a gear loose on the countershaft, the latter gear being provided with a relatively long hub or sleeve having anti-friction bearings at both ends on the countershaft, and including also a clutch element fixed on the countershaft adjacent to the hub of said loose gear, a clutch slidable lengthwise on and rotatable with said hub and adapted to engage the clutch element fixed to the countershaft, a clutch for connecting the driving and driven shafts in direct speed, and means for substantially simultaneously disengaging the direct speed clutch and engaging the countershaft clutch, and vice versa.

12. In a change speed gearing, the combination of a driving and a driven shaft, a countershaft, a plurality of differently sized gears fixed to the countershaft and in mesh with gears loose on the driven shaft, clutches for connecting to the driven shaft any gear thereon and a clutch for connecting the driven shaft direct to the driving shaft, a gear loose on the countershaft and in mesh with a gear fixed to the driving shaft, a clutch for connecting to the countershaft the gear loose thereon, the countershaft clutch being normally engaged so that the countershaft, its gears and the gears on the driven shaft will be revolved and any one of the latter gears may be connected to the driven shaft at will by operation of its respective clutch, and means for simultaneously engaging the direct speed clutch and disengaging the countershaft clutch, and vice versa.

13. In a change speed gearing, the combination of a driving and a driven shaft, a countershaft, differently sized gears fixed to to the countershaft and meshing with gears loose on the driven shaft, a gear loose on the countershaft and in mesh with a gear fixed to the driving shaft, clutches for connecting to the driven shaft any gear thereon including a direct speed clutch movable in one direction to connect the driven shaft direct to the driving shaft and movable in the opposite direction to connect the adjacent gear to the driven shaft, a clutch revoluble with the gear loose on the countershaft, a clutch element on the countershaft engageable by said countershaft clutch, and means for shifting the direct speed clutch and the countershaft clutch in unison, the countershaft clutch being so constructed that it will remain engaged during the neutral position and all speeds except the direct speed, in which it is disengaged at the time the direct speed clutch is engaged.

14. The combination with a casing in which a shaft is journaled and which contains lubricant for mechanism within the casing, of means for working the lubricant on the shaft inwardly from the casing wall through which the shaft extends, when the shaft is revolved in either direction, comprising a left and a right hand peripheral thread revoluble with the shaft and arranged adjacent to the bearing in such manner that one thread is adapted to be moved into and out of a position in which to circumscribe and cover the other.

15. In a driving mechanism in which a shaft adapted to be driven in reverse directions is journaled in a casing containing lubricant for mechanism therein, means revoluble with the shaft for working the lubricant lengthwise of the shaft inwardly from the casing wall through which the shaft extends, when the shaft is revolved in one direction, and other means revoluble with the shaft for working lubricant lengthwise thereof away from said casing when the shaft is revolved in the reverse direction.

16. The combination with a casing in which a shaft is journaled and which contains lubricant for mechanism within the casing, means for working lubricant on the shaft inwardly from the casing wall through which the shaft extends, when the shaft is revolved in either direction, comprising a peripheral thread on the shaft adjacent to said casing wall for working lubricant inwardly therefrom when the shaft is revolved in one direction, and a member revoluble with and slidable lengthwise on the shaft and having a portion adapted to circumscribe and cover said spiral thread and having also a peripheral spiral thread of a reverse lead from that of the first mentioned thread whereby to urge the lubricant inwardly from said casing wall when the shaft is revolved in the reverse direction, and means for moving said member to a position in which to uncover the first mentioned thread so that the latter will be rendered operative.

17. The combination of a shaft, means for revolving the shaft in opposite directions, including a clutch element shiftable lengthwise on the shaft to establish the driving connection in one direction, a spiral oil groove or thread about the shaft for working oil or other lubricant lengthwise thereof, and means adapted to cover said oil groove or thread and equipped on its periphery with a spiral groove or thread of a lead opposite from that of the first mentioned groove and movable by the clutch element into and out of a position covering said first groove, whereby the different oil grooves or threads will function respectively to work the oil or lubricant in a common direction lengthwise of the shaft when the same is revolved in opposite directions.

18. The combination of a casing, a shaft revoluble in the casing and extending through a wall thereof, means operated by the shaft for working oil or lubricant inwardly from said casing wall when the shaft is revolved in either direction, comprising a spiral oil groove or thread about the shaft, means adapted to embrace or cover said spiral groove and having a peripheral spiral thread or groove with a lead in the opposite direction from that of the first mentioned spiral groove, and means for moving said thread equipped means into and out of said groove-covering position upon reversing the direction of drive of said shaft so that said spiral grooves or threads will respectively function to work the oil or lubricant lengthwise of the shaft in a common direction upon the rotation of the shaft in opposite directions.

19. Means for working a lubricant or other liquid inwardly away from a wall or the like through which a revoluble member extends, when the member is revolved in either direction, comprising a peripheral spiral groove or thread about said member in proximity to said wall, and an outer peripheral spiral thread or groove about the first mentioned spiral thread and having a lead in the opposite direction from the same and being movable lengthwise of the revoluble member to cover or uncover the first spiral thread.

20. A speed change or shifting device for change speed gearing including in combination with a gear casing three shifting rods mounted in a common plane in the casing to shift lengthwise and each adapted by such movement to effect a change in speed or direction of drive, and means located wholly within the casing and actuated by the shifting of any rod lengthwise to positively lock the other two rods against lengthwise shifting movement.

21. In a change speed gearing, the combination of a driving and a driven member, a countershaft, gearing between the countershaft and driving and driven members, a clutch for connecting the driving member directly to the driven member, a clutch for connecting to the countershaft a gear loose thereon and in mesh with a gear on the driving shaft, and a clutch-shifting member having direct connection with both of said clutches and movable in one direction to fully engage one of the clutches and disengage the other, and in the other direction to fully operate the clutches reversely.

22. In a change speed gearing, the combination of a driving and a driven shaft, a countershaft, a plurality of differently sized gears fixed to the countershaft and in mesh with gears loose on the driven shaft, clutches for connecting to the driven shaft any of said gears thereon and a clutch for connecting the driving shaft to the countershaft, a clutch for connecting the driving shaft directly to the driven shaft, the countershaft clutch being normally engaged so that the countershaft, its gears and the gears on the driven shaft will be revolved and any one of the latter gears may be connected to the driven shaft at will by operation of its respective clutch, and means for simultaneously engaging the direct speed clutch and disengaging the countershaft clutch, and vice versa.

23. In a change speed gearing, the combination of a driving and a driven shaft, a countershaft, differently sized gears fixed to the countershaft and in mesh with gears loose on the driven shaft, means for connecting at will to the driven shaft certain of the gears thereon, whereby to establish any of a plurality of different speeds, a second means for connecting the driving shaft directly to the driven shaft to establish the direct speed and also adapted to connect to the driven shaft one of the gears thereon, a third means for connecting the countershaft with the driving shaft so that the countershaft and its gears in mesh with gears on the driven shaft will be revolved and any one of the latter gears may be connected to the driven shaft to establish its respective driving speed, and operating means for positively operating in unison the second and third named means for connecting the countershaft and the driven shaft respectively to the driving shaft, said third named means having a relatively long engagement so as to remain engaged while said operating means is operated to move the second named means into and out of a position connecting said one of the driven shaft gears to the driven shaft.

24. In a change speed gearing, the combination of a driving and a driven shaft, a countershaft, a gear fixed to the countershaft and in mesh with a gear loose on the driven shaft, a clutch operable in one direction to connect the driving shaft directly to the driven shaft and in the opposite direction to connect to the driven shaft said gear thereon, driving means between the driving shaft and countershaft including a clutch, and means for simultaneously moving the direct speed clutch and the clutch for driving the countershaft so that upon engaging the former clutch to establish the direct speed, the latter clutch will be automatically disengaged, the movable element of the clutch for driving the countershaft being always movable with the direct speed clutch so that when the direct speed clutch is disengaged the clutch for driving the countershaft will be engaged by said operating means and will remain engaged during the operation of the direct speed clutch to connect said gear to and disconnect it from the driven shaft.

25. In a change speed gearing, the combination of a driving and a driven shaft, a countershaft, driving means for connecting the countershaft with the driving shaft, means for connecting the countershaft with the driven shaft to drive the latter at any of a plurality of different speeds, means for connecting the driven shaft directly to the driving shaft, said connection between the countershaft and driving shaft including a gear constantly driven by the driving shaft, a clutch in constant driving connection with said gear and operable to connect the gear with and disconnect it from the countershaft, and operating means common to both said clutch and means for connecting the driven shaft directly to the driving shaft for operating the same in unison to disengage the latter and engage the former, and vice versa.

AXEL HJ. ASPROOTH.